Figure 2:
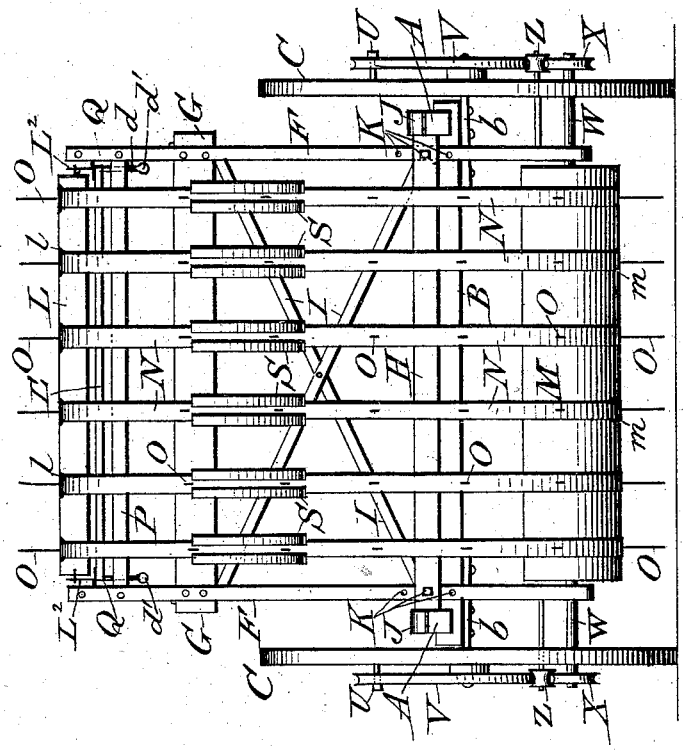

(No Model.) 2 Sheets—Sheet 1.

H. L. SHIELDS.
COMBINED HAY TEDDER AND LOADER.

No. 258,138. Patented May 16, 1882.

Attest:
H. H. Schott.
Wm. H. Brereton Jr.

Inventor:
Hamilton Leroy Shields
Per Wm H Brereton
Atty.

(No Model.) 2 Sheets—Sheet 2.
H. L. SHIELDS.
COMBINED HAY TEDDER AND LOADER.
No. 258,138. Patented May 16, 1882.
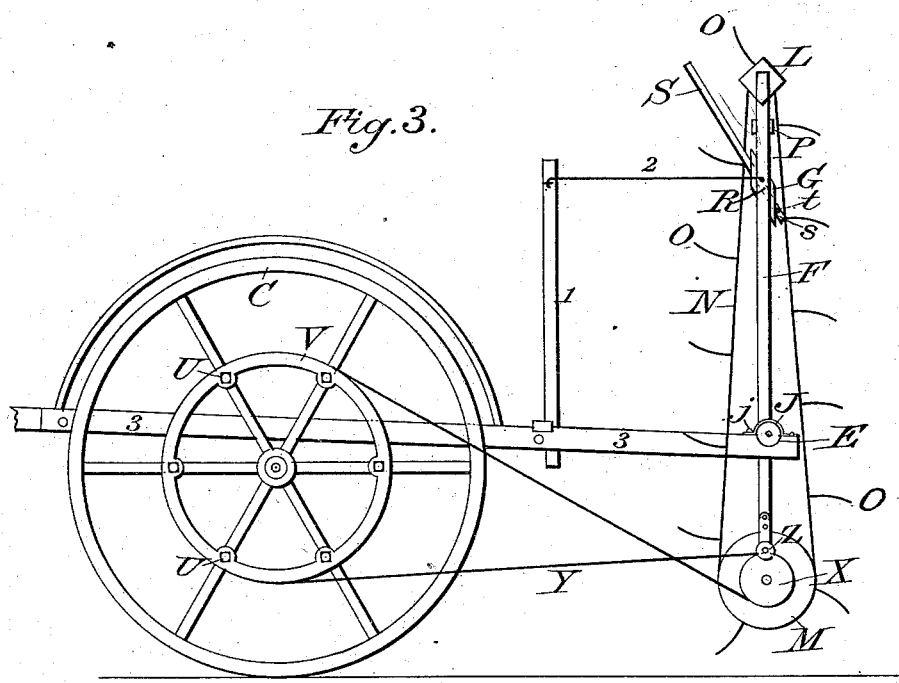
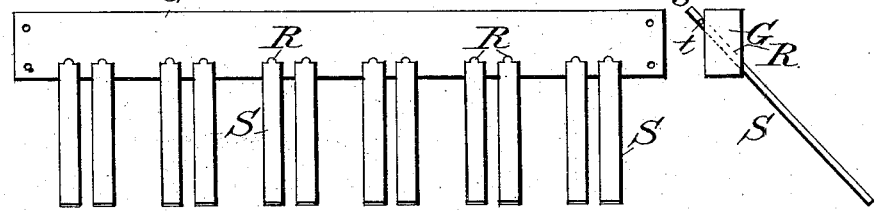
Attest:
F. H. Schott.
W. H. Brereton Jr.
Inventor:
Hamilton Leroy Shields,
By Wm. H. Brereton,
Atty.

UNITED STATES PATENT OFFICE.

HAMILTON L. SHIELDS, OF TROY, NEW YORK.

COMBINED HAY TEDDER AND LOADER.

SPECIFICATION forming part of Letters Patent No. 258,138, dated May 16, 1882.

Application filed November 25, 1881. (No model.)

*To all whom it may concern:*

Be it known that I, HAMILTON LEROY SHIELDS, a citizen of the United States, residing at Troy, in the county of Rensselaer and State of New York, have invented certain new and useful Improvements in Combined Hay Tedder and Loader; and I do hereby declare the following to be a full, clear, and exact description of the invention, such as will enable others skilled in the art to which it appertains to make and use the same.

This invention has relation to agricultural implements; and the said invention consists of an apparatus for saving labor and facilitating the operation of handling the hay, grain, &c., after being cut, in order to cure, gather, and store the same, as will be hereinafter fully explained. The said apparatus being so constructed and arranged as to adapt it to be used either as a tedder or loader, the class to which the invention belongs is therefore that of "combined hay tedders and loaders," and the particular parts of invention are:

First. A novel construction of the frame for supporting the tedding and loading devices, the same consisting of a pair of poles or light timbers extending rearward beyond the ground-wheels of the machine and provided in their top rear ends with recesses, a bar with trunnioned ends removably secured in said recesses, and two side vertical or upright pieces removably secured to the bar.

Second. The combination, with the supporting-pieces which extend beyond the ground-wheels, the cross-bar removably secured to said supporting-pieces, and the side vertical bars adjustably secured to said cross-bar, of two cross-bars extending from side to side of the machine and securing the vertical bars together, and two diagonal braces extending in a diagonal or slanting direction across the frame to brace and add strength to the same.

Third. A novel arrangement or device for cleaning or detaching the material from the tines or forks and directing the same over beyond the reach of said forks, said device consisting of a series of removable flat narrow blades, with smaller ends which fit into holes formed in a cross-piece of the elevator-frame, and are secured therein by pins or hooks, said holes being cut in the cross-bar of the elevator-frame on a downwardly-slanting line and in such position relatively to the bands carrying the forks that the forks will pass close between them, whereby by reason of the slanting holes the detaching-bars, when placed in one position, will extend downward and rearward, thus deflecting the material from the tines as they descend and allowing it to drop back upon the ground in the rear of the machine; and when placed in the reversed position or inserted from the opposite side of the frame the bars will incline upward and forward, detaching the material from the tines as they ascend and deflecting it upward and forward of the machine. In the first position of the deflectors the machine therefore acts as a "tedder," and in the second position as a "loader."

Fourth. A novel construction of the top roller of the elevator, the same being made with flat parallel faces or square in cross-section, and with circumferential grooves at intervals along its length for the hay-lifting bands, instead of round, as heretofore, whereby clogging at the top is prevented and the cleaning of the tines or forks is more effectual.

Fifth. A novel construction and arrangement of the several parts forming the elevating mechanism, the same consisting and being composed of two vertical side pieces, two horizontal cross-bars uniting said vertical pieces, a bar upon which the vertical pieces are secured and supported, a square roller at the top, a large cylinder at the bottom, and several endless forked or toothed belts passing around said rollers.

Sixth. A novel provision for keeping the material from lodging in close proximity to the elevator-frame, and also, in connection with hooked braces, forming a means for holding the top end of the elevating-frame in position, whether the apparatus be used as a tedder or loader, and at the same time affording means whereby to provide a seat for the driver, the same consisting of a vertically-braced frame or apron of same width as the elevator-frame, secured to the axle-bar just forward of the elevator, and of not quite the same height thereof, the seat for the driver being supported upon the top edge of this frame by suitable bent straps.

Seventh. A novel arrangement of detachable pulleys or driving-gears for operating, in connection with the driving-wheels, the elevating mechanism, the same consisting of a large grooved wheel adapted to be removably secured to the ground-wheels of the machine, a smaller grooved wheel on the lower cylinder or roller carrying the forked bands, connected by band with the large wheel on ground-wheel, and by which it receives motion, and a still smaller grooved wheel working just above the wheel on the cylinder, and in such position and of such width as to come directly over and slightly envelop the periphery of the cylinder-pulley at its point of contact therewith, whereby motion is communicated to the elevator apparatus, and the slipping of the band from the small pulley is prevented.

Figure 1:
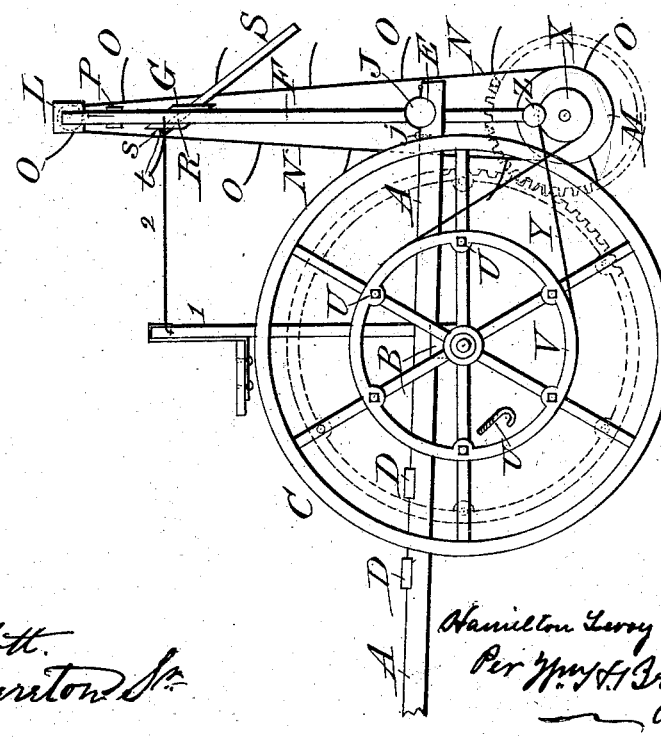

In the drawings, Figure 1 represents a side and Fig. 2 an end elevation of the apparatus in use as a tedder. Fig. 3 represents a side elevation of the apparatus in use as a loader; Figs. 4 and 5, detailed views of the "detacher," or device for removing the material from the tines of the elevator.

Similar letters of reference indicate like parts in the several figures.

A A are two light but strong pieces of timber, secured to a cross-bar, B, upon which, by short axle-arms $b\ b$, the drive or ground wheels C C are mounted. These pieces A A are made to converge toward the front, and of such length and distance apart that the portion projecting forward of the wheels will be sufficient to form the thills for the team, and the rear portion of such length to pass just beyond the periphery of the wheels. The front portion is braced by cross-pieces D D, which form a stand for the driver, and at the rear end is formed on each a recess, E, to receive the elevator-supporting bar.

The elevator-frame consists of two side pieces or uprights, F F, braced near the top by cross-pieces G P, and toward the bottom by piece H, which piece, being made of such length as to extend beyond the side pieces F, and, resting upon the thills A, forms the means of support for the entire elevator. Between these pieces G H are diagonal braces I I. The ends of the bar H which project beyond the side pieces F are made round and fit within the recess E in the thills, where they are secured by a hinged curved strap, J, bolted to the thills at $j$. A series of holes, K K, are made in the uprights F in the region of the supporting-bar H to provide means for vertical adjustment of the elevating-frame, for the purposes hereinafter set forth and shown. At the top of the frame, between the uprights F F, is journaled a horizontally-placed roller, L, and at the bottom a somewhat larger one, M. The roller L at the top is made with flat parallel external faces or square in cross-section, whereas the one, M, at the bottom is made cylindrical. The object of this will appear hereinafter. At certain regular intervals, and in line with each other in the faces of the rollers L M, are formed grooves $l\ m$ to receive endless bands N, to which are secured at regular parallel intervals curved teeth, tines, or forks O. The provision for tightening the bands consists, as shown in Fig. 2, as follows: Just beneath the roller L is a bar, L', held in position by screw-rods $d$, which pass through nuts in the bar P. These rods $d$ have thumb-pieces $d'$, by which means the bar L' is elevated or depressed. Upon the ends of bar L' are secured irons $L^2$, which form the bearings for the axles of the roller L. At certain intervals through the top cross-bar, G, are made in a downwardly-slanting direction holes R R. These holes, as will be seen, are made in pairs in close juxtaposition to the edges of the bands N. The object of these holes is to receive the devices or means for cleaning or detaching the teeth or tines of the elevator of their load of hay or other material. These "detachers," as they are called, consist, as shown in Figs. 4 and 5, of a series of thin and narrow rectangular blades, S, with round smaller ends $s$, which fit into the holes provided in the bar G. These detachers are of such width that when placed in position the elevator-teeth pass close between them. By this means the load of material brought up by the forks is, on coming in contact with the faces of the blades S, detached from the forks and permitted to again fall below. The socket ends of the detachers are of such length as to pass slightly beyond the bar G, through which projecting ends pins $t$, Fig. 4, are passed to secure the blades in place.

The object of making the holes to receive the detacher-blades entirely through the piece G, and to slant or incline downward, is to permit the introduction of the blades from either side, and so that when the blades are placed in the holes from the rear of the frame they will incline downward, as shown in Figs. 1 and 2, and when inserted from the front will incline upward, as shown in Fig. 3. By this means, when the blades are placed in the first position, the material is cleaned from the forks and permitted to fall again to the ground at the rear of the machine, thus acting as a tedder, whereas when the blades are in the second position the material is detached as it is carried upward, and is deflected upward and forward of the machine, falling upon the bed of the wagon, thus acting as a loader. This completes the elevating apparatus.

The driving mechanism is obtained from the following arrangement of devices: To the round-wheels C are secured by hooking bolts U engaging—around the spokes—grooved rims or wheels V. To the axle W of the lower cylinder, M, is secured a small pulley, X, grooved similar to the one V. A band or belt, Y, passes around the large wheel V, and, after being crossed, around small pulley X, by which motion is communicated from the ground-wheels to the elevating apparatus. To prevent the slipping of the band Y from the pulley X, a small grooved pulley slightly wider than the one X is arranged to run just above and so as to envelop the edges of the pulley X at the point of contact therewith, as shown at Z. Instead of using grooved pulleys and wheels, as above described, a large cogged wheel may be secured to the spokes of the ground-wheels, which may mesh into cogs on the lower cylinder, if desired, as shown in dotted lines, Fig. 1; but the grooved wheels and band are preferred. This completes the mechanism for driving the elevating apparatus.

Secured to the axle or cross-piece B, in a vertical position, is a strong but light frame or apron, 1, of an equal width as the elevator-frame, reaching from side to side between the thills A, and of such height as to extend about on a horizontal line with the lower part of the detachers S when they are inserted from the front of the machine, as shown in Fig. 3. This apron or dividing-board serves as a means for bracing the top of the elevator-frame through hook-rod 2, Figs. 1 and 3, and as a means of attachment for a driver's seat, which, being provided with curved hooks, may be suspended upon the top edge thereof, as shown in Fig. 1. This board or apron, also, in case the apparatus is used as a loader, Fig. 3, prevents the lodgment of the material too close to the elevator-teeth, and it assists in confining the material upon the forks as it is carried upward.

The object of making the upper roller with sharp edges or square in cross-section, as shown in Figs. 1 and 3, is because it has been found in practice to prevent the winding and clogging of the material around this roller, which, when a round roller was used, occurred frequently, but by the use of the square was almost entirely avoided. It also assists in cleaning the material from the tines.

The operation of the apparatus is apparent from the drawings. The position of the parts being as shown in Fig. 1, the revolution of the ground-wheels causes the wheels U to revolve, and, through the band Y and pulley X, the cylinder M, causing the endless toothed bands N O to move around over said cylinder, and upward and around the upper roller and down again. The teeth or forks of the bands coming in contact with the loose hay, grain, straw, or other material on the ground, it is caught up and carried upward. Coming in contact with the projecting sharp edges of the top roller, the hay is slightly lifted from the bands and loosened from the forks, and, passing over the roller without winding or clogging thereon, it arrives at the detachers, where the material is gradually withdrawn from the teeth and permitted to fall back in the rear of the machine. This in case the machine is used as a tedder.

By the use of this apparatus the hay is much more rapidly, effectually, and better cured than by the usual practice, for by reason of its being lifted up such a height from the ground it is lightened up, and the sun and air are permitted to pass freely through it. All portions of the hay also receive the same amount of sunning and airing. It consequently is all cured alike.

The operation of the apparatus as a loader is precisely similar to that for a tedder, except that the material is deflected forward and upward, falling upon the body of the machine to which the elevating-frame is attached, instead of backward and at the rear thereof.

To convert the machine into a loader after having been used as a tedder, the driver's seat is removed from the dividing-board, the deflectors are withdrawn from the rear of the machine and placed in the front position, as shown in Fig. 3. The entire apparatus is then, by means of the thills or similar bars, attached to the rear of a farm hay-wagon. The wagon, with the machine at its back, being slowly drawn along the windrows of hay, the forks catch the hay up and carry it upward. On reaching the deflectors it is loosened therefrom, and directed upward and forward over the apron or dividing-board upon the wagon.

It is not intended to use the apparatus in exactly this manner, however, although this could be done; but instead thereof it is proposed to take two pieces of timber, 3, Fig. 3, similar to the thills A A, but not of quite the same length, and without the front cross-braces, D, and bolt them directly to the side timbers or bed of the ordinary farm hay-wagon. The grooved power-wheel must in this case be secured to the wagon-wheel, as shown in Fig. 3. The other parts are the same as in Fig. 1. The thills A, Fig. 1, could be arranged to be used for this purpose by providing bolt-holes along the front portion, removing the wheels C and cross bars or braces D.

Should the material, be it either hay, straw, or grain, be light, it would be necessary to bring the forks closer to the ground; or, if the crop be heavy, the forks need not be so close. This is provided for by raising or lowering the elevator-frame, and this is done through the medium of the adjusting-holes K in the standards F.

The dividing-board or apron 1 serves as a support for the driver's seat, thus assisting in balancing the machine.

The advantages claimed for the herein-described apparatus are manifold: economy of time, labor, and space in combining in one apparatus two separate and distinct implements, thereby lessening the expense necessary to furnish a farm with first-class modern labor-saving machinery. The entire apparatus may be taken into the field at once. After the grass or grain is cut, the machine, arranged as a tedder, is set to work. The process of curing the material is thus greatly facilitated, and the time usually occupied in the operation shortened. A saving is therefore gained in this step. After the material is properly cured a rake is set in operation and windrows formed. Then, after the windrows are completed, the loader is adjusted in position, and the material quickly and effectually loaded upon the wagon.

Altogether the combined machine herein described forms an important labor-saving expedient in agriculture, and an essential element to successful farming.

Having now fully described my invention, its operation, advantages, &c., I will proceed to state what is claimed as new therein upon which protection by Letters Patent is sought.

I claim—

1. In combination with the pieces A, extending rearward beyond the ground-wheels and provided in their top rear ends with recesses E, the bar H, with trunnioned ends removably secured in said recesses E, and uprights F of the elevator-frame, removably secured to the bar H, as and for the purposes hereinbefore described.

2. In combination with the pieces A, the elevator-frame composed of cross-bar H, which supports the entire elevator-frame, side vertical bars, F, adjustably secured to said bar H, cross-bars G P, and diagonal braces I, substantially as and for the purposes described.

3. In combination with the cross-bar G of the elevator-frame, provided with a series of inclined holes therein, the deflector-blades S, placed in pairs adjacent to the toothed bands O, and adapted to be inserted in position upon either side of the cross-bar, for the purposes specified.

4. In combination with the toothed bands, the top roller made with flat parallel faces or square in cross-section, and with circumferential grooves, substantially as hereinbefore described, for the purposes specified.

5. The elevating mechanism consisting of frame F G, supporting-bar H, top square roller, L, bottom large cylinder, M, and endless forked belts N O, substantially as and for the purposes described.

6. In combination with the frame A and axle B, the dividing-board 1 for supporting the driver's seat, and, in connection with removable hooked braces 2, holding the top end of the elevating-frame in position, as hereinbefore described.

7. In combination with the ground-wheels C, the large grooved wheel V, removably secured to said ground-wheels, smaller grooved wheel X upon the lower cylinder, cord Y, and small grooved pulley Z, whose flanges overhang the edges of the pulley X at the point of contact therewith, substantially as and for the purposes described.

HAMILTON LEROY SHIELDS.

Witnesses:
JOHN C. COLE,
THEO. E. HASLEHURST.